United States Patent [19]

Ray, Jr. et al.

[11] Patent Number: 5,148,435
[45] Date of Patent: Sep. 15, 1992

[54] TESTABLE MODEM AND DATA COMMUNICATIONS NETWORK

[75] Inventors: Robert E. Ray, Jr.; Dean Y. Hodge, both of Madison, Ala.

[73] Assignee: Universal Data Systems, Inc., Huntsville, Ala.

[21] Appl. No.: 518,365

[22] Filed: May 3, 1990

[51] Int. Cl.[5] .......................................... G06F 11/00
[52] U.S. Cl. ................................. 371/20.5; 371/20.1
[58] Field of Search ................. 371/20.1, 20.2, 20.5; 370/13, 13.1, 15

[56] References Cited

U.S. PATENT DOCUMENTS

| 3,920,975 | 11/1975 | Bass | 371/20.5 |
| 4,002,847 | 1/1977 | Dail | 370/15 |
| 4,819,235 | 4/1989 | Kelly et al. | 371/20.1 |

*Primary Examiner*—Robert W. Beausoliel
*Assistant Examiner*—Phung My Chung
*Attorney, Agent, or Firm*—Wayne J. Egan; Joseph P. Krause

[57] ABSTRACT

A modem, or data communications device, that is testable independently of a DTE device permits remote testing of it automatically by a network management computer or controller reducing required operator intervention. A data communications network that has possibly hundreds of these modems requires substantially less operator intervention.

29 Claims, 2 Drawing Sheets

TESTABLE MODEM AND DATA COMMUNICATIONS NETWORK

BACKGROUND OF THE INVENTION

This invention relates to data communications devices such as modems. Data communications devices, such as modems, multiplexers, and digital service units, are generally well known in the art. These devices are typically used to transmit digital data signals from one computer to another using telephone lines or other communications channels.

Data communications devices or modems frequently include microprocessors that enable them to perform other functions in addition to their data communications function. Many of these data communications devices include the ability to run diagnostic tests on internal circuitry to identify when a fault has developed. Many have the ability to perform a so-called local loop-back test wherein the device accepts data from a DTE device (such as a computer or computer data terminal) connected to a DTE port, sends the data through the data communications device and returns it back to the DTE device, which compares the data returned from the modem to the data sent into the modem. In such a local loop back test, if the data returned from the modem matches the data sent, the modem may be assumed to be working properly.

In addition to local loop-back tests, many data communications devices also include the capability of testing at least portions of a distant data communications device that it is communicating with by instructing the far-end device to enter a remote loop-back test mode and thereafter sending test information from the near end communications device to the far-end data communications device, which loops the test data back to the sending device. In such a far end loop-back test, if the data returned by the far end matches the data sent, it can reasonably be assumed that the communications channel and the modems or data communications devices are both working properly.

Even though many of these data communications devices include the capability of testing themselves locally, as well as testing a far-end device remotely, running these tests typically requires the interaction of an operator who must initiate the test via a DTE at one end of a communications loop. (A communications loop can be considered to be comprised of data communications devices coupled together through a telephone link or other communications channel.) In a large distributed communications network which might have hundreds of modems or data communications devices, any one of which is capable of communicating with other modems of the network, running such manually controlled tests on each modem is a labor-intensive task.

A data communications device or modem for coupling a DTE device to a communications channel that is testable under the control and direction of a single central computer would be an improvement over the prior art in that it would reduce the required operator intervention. A data network of communications devices that are testable by a computer from one central location would also be an improvement over the prior art.

SUMMARY OF THE INVENTION

There is provided herein an exemplary embodiment of a modem, or data communications device, that may be tested under the control of a computer coupled to the device through a control port, functionally distinct from DTE and DCE ports normally found on modems or data communications devices. When used in a data communications network, which might have hundreds of modems at widely separated locations, the remote testability of the data communications device described herein can substantially reduce operator labor costs attributable to maintenance of the network.

The data communications device described herein has a DTE port that couples a DTE device, such as a computer to it. It also has a DCE port for coupling the data communications device to a communications channel, such as a telephone line. The data communications device also includes a control signal port to which a computer, different than the DTE device, sends control and tests signals that cause the data communications device to conduct certain tests. The control signal port and circuitry associated with it, permit a computer or other similar device coupled to the control signal port to initiate and perform operating tests on the data communications device independent of a DTE device coupled to the DTE port. A suitably programmed computer (including appropriate hardware) coupled to the control port can instruct the data communications device to configure itself in such a way that test signals may be sent through the modem that verify its operation.

In a large data communications network that may have hundreds of separate modems a centrally located management system computer or controller coupled to the control port of each local modem through a control channel can test and monitor each of the local modems and the corresponding remote modems simply by sending control and test signals to each local modem through the control channel. The network management system controller can test the data communications devices automatically under program control. The data communications devices retain the capability of having an operator manually initiate tests on modems via a DTE connected to the modem.

DETAILED DESCRIPTION OF THE PREFERRED EMBODIMENT

Figure 1:
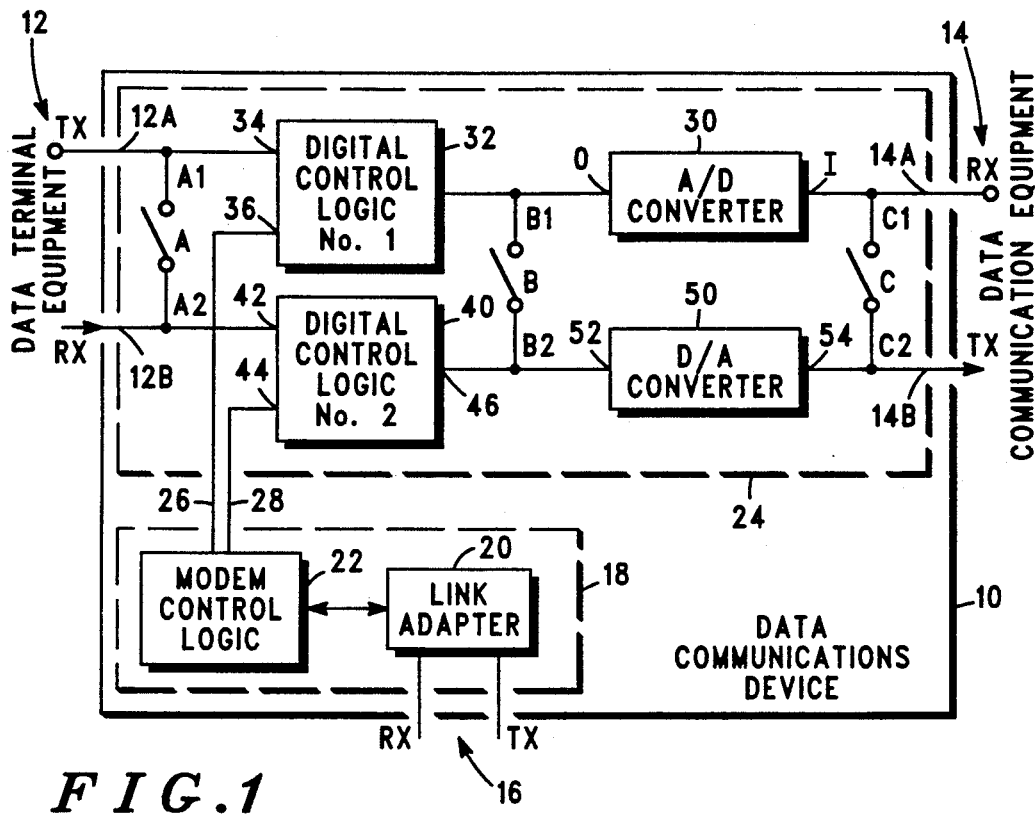
FIG. 1 shows a block diagram of the elements of a data communications device.

FIG. 1 shows a block diagram of the functional elements of a data communications device (10) used to couple a DTE device to a communications channel that is testable by a computer other than the DTE device. A DTE device, such as a computer of ASCII data terminal for example, would of course be coupled to the DTE port (12). The DCE device shown in the figures is a communications channel, such as a telephone line.

The data communications device (10) shown in FIG. 1 includes a control signal port (16) which is similar operation to a data port such as the DTE and DCE ports in that it receives information signals having a predefined protocol from a computer or similar device. The control signal port receives control and test information. It does not receive DTE or DCE type signals. The control signal port permits a controlling computer (referred to hereafter as the network management controller) and the data communications device (10) to communicate with each other through a control channel linking the controlling computer to the data communications device.

Figure 4:
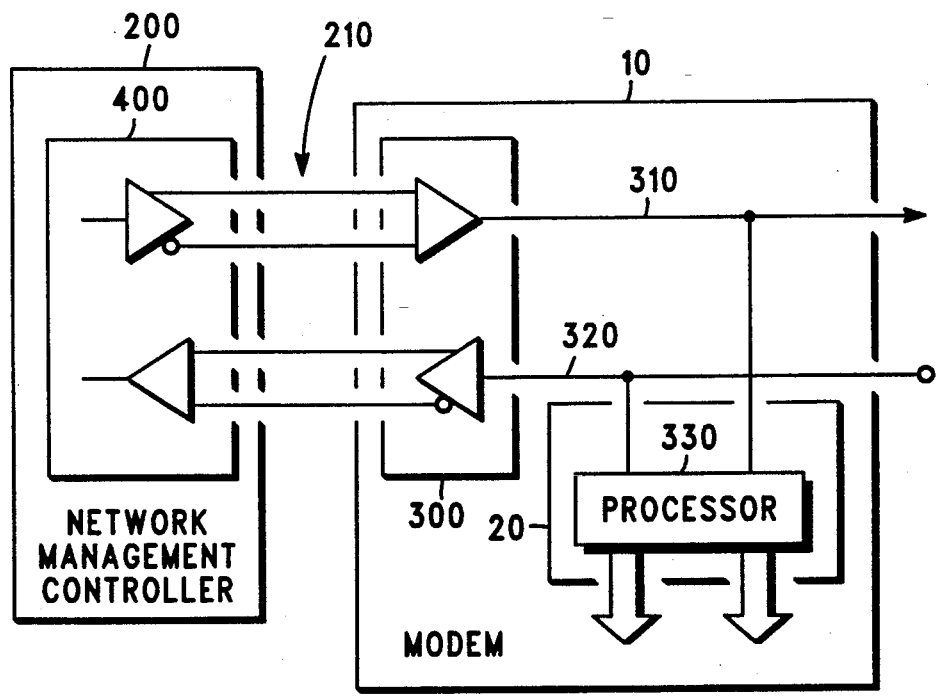
FIG. 4 shows a representative block diagram of interface circuitry of the system shown in FIG. 1.

Still referring to FIG. 1, it will be seen that the data communications device (10) shown in FIG. 1 includes a coupling circuit (18) that processes information from the network management system controller linked to the communications device (10) through the control channel (not shown in FIG. 1). The coupling circuit (18) shown in FIG. 1 is comprised of a link adaptor circuit (20) (a representative of block diagram of which is shown in FIG. 4), and some interface control logic (modem control logic, 22) that links the network management system controller to the communications device (10) and its associated control logic (data communications circuitry 24 and discussed below), which is a modem. Alternate embodiments of the coupling circuit might include any circuitry capable of receiving signals from the control channel, detecting information thereon and executing commands sent to the communications device from the network management controller. Of course the coupling circuit might include single chip microcontrollers, such as an Intel 8051 for example, and appropriate bus transceivers (line drivers and receivers) for sending and receiving signals on the control channel. Other embodiments might also include custom LSI devices using combinational and sequential logic devices.

Also included in the data communications device (10) shown in FIG. 1 is the data communications circuit block or modem (24) that functions as the interface between the DTE device (which is a digital device) and the DCE device (which is typically an analog signal transmission medium such as a telephone line). The data communications circuits shown in FIG. 1 are of course simplified block diagrams, the functions of which are found in most data communications devices.

In order to couple signals between a common telephone line (which carries analog signals) or other analog communications channel, and a DTE device such as a computer, most modems, or data communications devices, typically include at least one analog to digital (A/D) converter (30) functional block which receives analog signals from the communications channel coupled to the receive port (14A) of the DCE port (14). The signals on the communications channel are generated from a far-end data communications device not shown in FIG. 1 but carried to the data communications device shown (10) over the communications channel. (The A/D function might also be performed using a digital signal processor (DSP) for example.)

The analog information input to the A/D converter (30), is converted into a digital data stream (found at output terminal O of the A/D), that, in FIG. 1, is coupled into a first digital control logic block (DCL) (32) that processes the digital output of the A/D converter and has two digital outputs (34 and 36). In addition to processing the data output of the A/D into a format that when output at DTE port 12 the data is compatible with certain industry standards, such EIA standard RS-232 for example, the digital control logic block (32) functions as a signal splitter in that data received from the A/D converter circuit (30), is coupled to both the DTE port (12) and the modem control logic (22). The digital control logic block's second output (36) has identical signals present at both outputs (34 and 36).

Information signals from the DTE device are coupled to the data communications device (10) through the receive data port (12B) of the DTE port (12) as shown. The second digital control logic block (40) shown has at least two digital input terminals, (42 and 44). One input (42) receives digital signals from the DTE device; the second digital input (44) of the second digital control logic block (40) receives signals from the modem control logic block (22). (The signals from the DTE device will typically comply with some standard, such as RS-232 for example.) The second digital control logic block (40) processes the digital signals input at terminals 42 and 44 and combines these two signals to form one output signal at the output (46) of the second digital control logic block (40). (As explained below, in running tests on the data communications device the DTE will preferably not send data into the second digital control logic block (40) if test signals are being input to the second digital control logic block from the coupling circuit. Sending data from both the DTE device and the coupling circuit would likely produce inaccurate test results. A predefined command from the network management controller can be sent to the link adaptor (20) for selectively decoupling a DTE device from the DTE port (12). The output of the second digital control logic block (40) is coupled to an analog to digital converter functional block (50) that generates signals for transmission on the communications channel.

In testing modems, including the data communications device shown in FIG. 1, a commonly employed test methodology is to send signals from the DTE, for example, to the second DCL block (40), through the D/A (50), loop the signals from the output of the D/A to the input of the A/D, to the first DCL (32) back to the DTE where the received signals may be compared to the signals originally sent to verify that the functional blocks accurately processed and reproduced the information in the signals.

In FIG. 1, the data communications device (10) includes at least three switches that are responsive to at least the coupling circuit (18) (A, B, and C as shown) and that can be used to loop information from one data path of the device (10) onto another. For example, closing switch C, will couple digital signals from the DTE device that have passed through the D/A (50) and the second digital control logic circuits (40). If these processed signals are successfully recovered at terminal 12A of the DTE port (12), it can be reasonably assumed that the functional blocks shown are working correctly.

In the embodiment shown in FIG. 1, the link adaptor (20), which is more fully described below, has the capability of closing the loop-back switches (A, B, and C) in response to commands sent to the link adaptor (20) of the data communications device (10) through the control port (16). The link adaptor (20) combined with the modem control logic block (22), and the second output (36) of the first digital control logic circuit (32) and the second input (44) of the second digital control logic circuit (40) permit a network management controller coupled to the data communications device (10) through the control port (16) to test most of data communications device (10), independent of a DTE device coupled to the DTE port (12).

Figure 2:
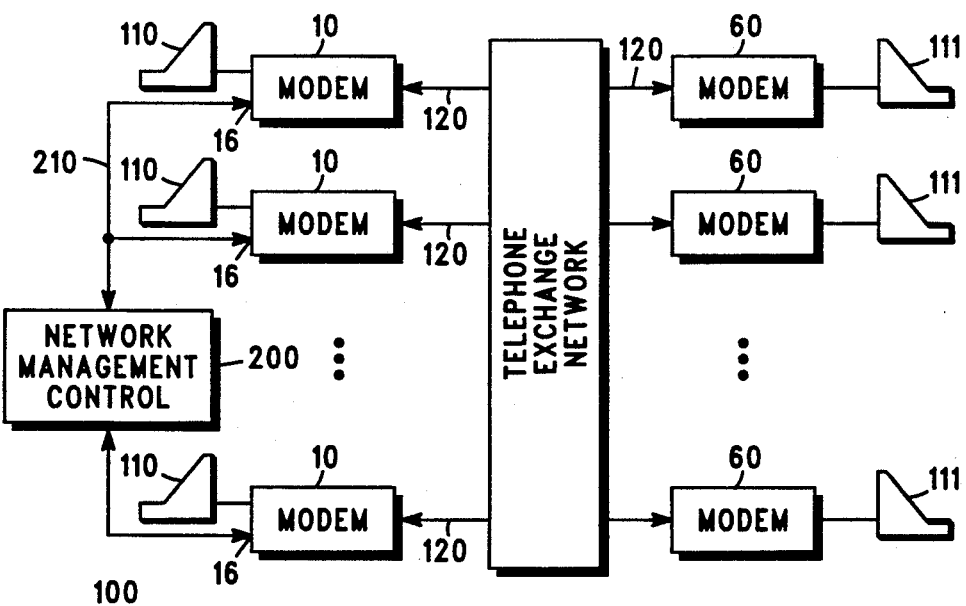
FIG. 2 shows a block diagram of a data communications system using data communications devices such as those shown in FIG. 1.

FIG. 2 shows a block diagram of a distributed data network (100) for coupling information between multiple DTE devices (110) coupled to multiple data communications devices (10), such as the one shown in FIG. 1. When coupled to the data communications devices, (10) the DTE devices, (110) can communicate with so-called far end corresponding DTE communications devices (111) coupled to other data communications devices (60) located at a distant location (far-end) via a communications channel (120), which includes a switched telephone exchange (130) or other similar network. (It should be understood that information signals passing between DTE devices (110 and 111) are bi-directional, in that data flows in both directions.)

The communications channel (120) is typically a telephone based communications resource. It might also include a so called computer local area network communicating over a fiber optic cable. It might also include a secure network (encrypted data network) using a microwave radio network or any other type of data network. The switching network (130) might be a telephone operating company exchange, or a local office PABX, or a computer network file server for example.

In FIG. 2 the simplified distributed data communications network data communications devices (10) (as well as the communications channels (120) and for end devices (60) can be remotely tested by a computer, the central network management resource controller. (Testing the data communications devices using a computer would include automatically testing these under software control. Such an automated system might include automated report generation, and conducting the tests during periods when traffic is low.) In FIG. 2, the network management controller (200) can test any of a plurality of data communications devices (10), shown in FIG. 1, by sending test control and information signals to the data communications devices (10) through a control channel (210) that links the network management controller (200) to the plurality of communications devices (10) through their control ports (16). By sending a predefined format message packet to the data communications devices (10) the network management controller (200) may instruct the data communications devices (10) to perform, for example, either a local loop-back mode test using one of the three switches (A, B or C) as shown in FIG. 1, or, alternatively inform the data communications devices (10) that they will be taking part in a far-end loop-back test whereby a far-end digital data communications device (12) loops data that originates from the network management controller (200), goes through the local data communication devices (10), through the data communications devices at the far-end (60) which internally loop the data back to the network management controller (200) via the communications channel (120) and the local data communications device (10).

In performing a local loop-back test, such as it is described above, the network management controller (200) sends a predefined packet of control information and possibly including test data through the link adaptor (20) of the data communications device (10). The link adaptor (20) will receive this information through its control port (16), decode the information and execute whatever instruction is sent to it from the network management controller (200).

Figure 3:
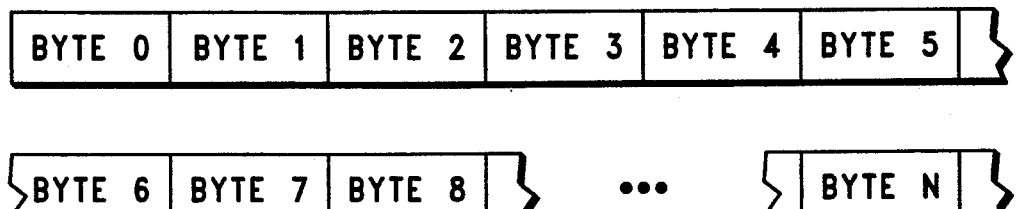
FIG. 3 shows a message frame used to communicate between a network management controller shown in FIG. 2 and a data communications device as shown in FIG. 1.

In a local digital loop-back test, switch B is closed by the link adaptor (20) under the direcation of the network management (200). Switch B closure will cause information signals from the output (46) of the digital control logic block (40) to be routed to the input side of the digital control logic block (32), which can be recovered at the second output (36) of the first digital control logic block (32). Actual test data is generated at the network management control (200) and is sent to the link adaptor (20) over the control channel (210). The link adaptor (20) extracts test data from information packets or data frames (the format of which is shown in FIG. 3) from the network management controller and send the test data to the modem control logic circuitry (22). The modem control logic circuitry routes the test data over a data bus (28) to the second input (42) of the digital control logic block (40). The second digital control block routes the test signals from its output (46) to the input of the digital control logic block (32) through switch B. The second output (36) of the first digital control logic block (32) returns the test signals back to the modem control logic block (22), which returns the test signals to the link adaptor (20), which returns the data signals to the network management controller (200) by the control channel (210).

A local analog loop-back test is performed similarly, but instead of closing switch B, switch C is closed under the command of the network management controller (200). When switch C is closed data received at the link adaptor (20) from the network management controller (200) and coupled through the modem control logic block (22) to the second input (44) of the digital control logic block (40) passes through the D/A converter (50). The D/A converter (50) output signals are rerouted by switch C to the analog input of the A/D converter (30). The A/D converter demodulates or reconverts the analog signals back to a digital format and sends them to the first digital control logic block (32) whereupon the second output terminal (36) returns these signals back to the link adaptor (20) through the modem control logic block (22). The link adaptor (20) returns the signals back to the network management controller (200) for subsequent comparison of the returned data to the sent data.

FIG. 3 shows a serial bit stream frame of digital signals, also referred to as a data frame, command frame, or data packet, that includes several serial data bytes, numbered 0 through N. The data frame is a representative data packet sent from the network management controller (200) to the link adaptor (20) of the communications device (10). While the embodiments shown in FIGS. 1 and 2 used serial bit streams between the network management controller (200) and the link adaptor (10), alternate embodiments would of course contemplate using a parallel data channels.

In the preferred embodiment, the link adaptor (20) expects that the data packet will have a predefined format and expects certain information in certain bytes. Byte 0 is an ASCII STX that identifies the start of the data frame shown in FIG. 3. Byte number 1 is a length byte indicating to the link adaptor (20) how many bytes follow byte 7. Bytes 6 and 7 will ordinarily contain cyclical redundancy check characters, or CTC bytes, that may be used to verify the integrity of the information in the frame.

Bytes 3 and 4 are address bytes that may be used to address the packet to particular link adaptors (20) of particular data communications devices (10) on the control channel (210). In the preferred embodiment bytes 3 and 4 and also contain information flags that are relevant to the operation of the link adaptor in other respects but not related to the testing of the data communications device (10) or the distributed data network (100) shown in FIG. 2.

FIG. 3 is a command byte and will ordinarily contain characters that the link adaptor will identify as directing the testing of either the digital or analog loop-back modes as described above, or, digital or analog far-end loop back tests described below. Information following byte 7, i.e., information in bytes 8 through N, would ordinarily contain instruction bytes and data bytes that the link adaptor (20) will use to determine what action to take next.

In many instances, it is desirable to request the far-end digital communications devices (60) to loop signals received from a local digital communications device (10) back to the originating communications device. In these instances the far-end data communications device (60) must be responsive to commands, also known such as modem control signals, in the data traveling in the communications channel (120) that the data communications device (60) will detect and decode and cause the device (60) to reroute the information back to the originating data communications device (10).

The data communications device (12) as shown in FIG. 2, will preferably be identical to those devices (10) an shown, however, many commercially available modems on the market today also include the capability of performing a so-call analog far-end loop-back which data communications device (60) would be performing but do not include the capability of monitoring a network management controller (200) as are the data communications devices (10). The data communications devices (10) shown in FIG. 1, if used to replace the devices (60) shown in FIG. 2 are capable of performing these so called far-end loop-back tests. The data communications device (10) shown in FIG. 1 include the ability of embedding modem control signals into the data sent onto the communications channel from the DCE port. The link adaptor could insert these signals from the second input (44) of the second digital control logic circuit (40).

If the data communications device of FIG. 1 is acting as a far end modem, control circuitry within the data communications devices (10) detect control signals on the data in the information on the communications channel (120) and close switch contacts A, B, and C, as shown in FIG. 1, so as to cause rerouting of the signals back to the local data communications device. The link adaptor (20) could test signals output from the second output (36) of the first digital control logic circuit (32) for modem control signals sent from the local or near end modem/data communications device.

Referring to FIG. 1, if it assumed that the data communications device (10) shown in FIG. 1, is located a far-end data received at the receive port (14A) of the DCE port (14) can be rerouted back to the transmit terminal (14B) of the DCE port (14) by closing switch contacts C, B or A, depending upon how much of the data communications device (10) is to be tested. A far-end digital loop-back may be performed by closing switch B. No commercially available modems contemplate closing switch C at the far end, effecting so-called REMOTE ANALOG LOOP-BACK TESTING, which might be performed however using the data communications device shown in FIG. 1 (10).

No commercially available modems in use today, contemplate closing switch A at a far-end whereby the data received at the receive terminal (14A) is routed substantially through the data communications device (10) and shunted by switch A back through substantially all of the modem to the output at the transmit terminal (14B) (Closing switch A effects so called REMOTE DIGITAL LOOP-BACK TESTING). The data communication device (10) shown in FIG. 1 includes this capability however should industry standards require such testing. Closure of switches B and C by the data communications device (10) shown in FIG. 1, would ordinarily occur by a control circuitry within the data communications device (10) which may be control logic or intelligence in the link adaptor (20). The link adaptor (20) would of course therefore have to detect loop-back commands imbedded in the data sent into the DCE port (14) from the data communications device (10) at the local or near end.

Referring to FIG. 4, there is shown a block diagram of the link adaptor (20) as well as interface circuitry (300 and 400) that might be used to couple the data communications device (10) to a data communications control channel (210) and a network management controller (200). In the embodiment shown, the control channel (210) is an RS-422 bus although RS-232, RS-485, or any other appropriate bus standard might be usable to couple signals between the network manager controller (200) and the data communications device (10).

In using an RS-422 bus for the control channel (210) the data communications device (10) includes interface circuitry (300) that includes a balanced to unbalanced line drivers and unbalanced to balanced converters as required. The link adaptor (20) is typically a microprocessor such as a Motorola 6805 or other appropriate device programmed to monitor the transmit (310) and receive lines (320) of the control channel (210). The microprocessor (330) of the link adaptor will output signals to the modem control logic block (22) as shown in FIG. 1 that will include commands to close switches A, B, and C for instance or to open said switches upon the direction of network management controller (200). The link adaptor (20), and its included microprocessor (330) will also receive test vector or test signals that are inserted into the transmission loop at either the second input (44) of the digital control logic block (40) or are received at the second digital output of the digital control logic block (32).

From the foregoing description it should be apparent that a distributed data network that may have hundreds of data communications devices at widely separated areas can be tested and diagnosed from a central location using a network management control device (200) such as that described above whereby many devices can be monitored simultaneously without the intervention of an operator. In the data communications network (100) as shown in FIG. 2, the data communications devices (10) or modems are preferable rack mounted in an equipment bay or equipment rack but may alternatively be distributed through out an office environment coupled to the network management controller by a suitable data link.

What is claimed is:

1. A testable data communications device having a data terminal equipment port, a data communication equipment port, and a control signal port, said testable data communications device coupling information between a data terminal equipment device coupled to said data terminal equipment port and a communications channel coupled to said data communication equipment port, said testable data communications device communicating with a network management system controller through said control signal port over a control channel, said data communications device comprising:

coupling means, coupled to said control signal port, for coupling information signals between said network system controller and said testable data communications device via said control channel through said control signal port;

data communication means coupled to the coupling means for coupling information signals from said data terminal equipment device to said communications channel; for coupling information from said communications channel to said data terminal equipment device, and, in response to control signals from said network management system controller received by said coupling means at said control signal port:

a) for coupling information signals at said control signal port through said data communications means to said communications channel;

b) for coupling information signals on said communications channel through said data communications means to said control signal port; and c) for coupling a first information signal received through said control signal port through a coupling circuit through said data communications means, said first information signal being processed by said data communications means which generates a second information signal based on said first information signal, said second information signal looping back through the data communications means which generates a third information signal, said third information signal returning through said coupling circuit to said control signal port;

said data communications means further including means for routing test information signals through said data communications means.

2. The testable data communications device of claim 1 where said information signals received at said control signal port include test information signals and control information signals, said control information signals controlling the routing of test information signals through said data communication means.

3. The testable data communications device of claim 1 where said coupling means is comprised of:

link adaptor means for processing signals received from said network management system controller on said control channel through said control signal port, for controlling said data communication means, and for generating control and information signals for said network management system controller and for said data communication means; and interface means coupled to the link adapter means for receiving information signals on said control channel, for coupling said information signals on said control channel to said link adaptor means, and for coupling control and information signals from said link adaptor means to said control channel.

4. The testable data communications device of claim 3 where said data communication means is further comprised of:

digital to analog converter means coupled to the data communications equipment port, having a first digital input and a first analog output, for converting digital information signals into analog information signals at said first analog output that are compatible with said communications channel;

first digital control logic means coupled to the digital to analog converter means, having a first input for coupling digital information signals from said data terminal equipment device to said first digital input of said digital to analog converter means and having a second input for coupling digital information signals from said link adaptor means to said first digital input of said digital to analog converter means and an output;

analog to digital converter means coupled to the data communications equipment port, having a first analog input and a first digital output, for converting analog information signals received on said communications channel at said first analog input to digital information signals output at said first digital output;

second digital control logic means coupled to the analog to digital converter means, having an input and at least first and second outputs, said first output for coupling digital information signals received from said first digital output of said analog to digital converter means to said data terminal equipment device, said second output for coupling digital information signals received from said first digital output of said analog to digital converter means to said link adaptor means.

5. The testable data communications device of claim 4 further including: first switch means coupled to the data communications equipment port, responsive to at least said link adaptor means, for coupling signals from said first analog output to said first analog input.

6. The testable data communications device of claim 4 further including: second switch means coupled to the analog to digital converter means and the digital to analog converter means, responsive to said link adaptor means, for coupling digital signals output from said digital control logic means to said input of said second digital control logic means.

7. The testable data communications device of claim 4 where said link adaptor means includes a microcomputer.

8. The testable data communications device of claim 1 including:

data terminal equipment switch means coupled to the data terminal equipment port, responsive to control signals received at said control signal port, for selectively inhibiting receipt of signals from said data terminal equipment by said data terminal equipment port.

9. The testable data communications device of claim 8 where said data terminal equipment switch means includes decoupling command means for detecting a command sent from said network management controller that is to cause said data terminal equipment device to be decoupled from said data terminal equipment port.

10. The testable data communications device of claim 1 where said data communication means further includes:

means for coupling modem control signals to said communications channel, said modem control signals causing a far-end data communications device coupled to said communications channel to process information signals on said communications channel from said testable data communications device and return said processed information signals to said testable data communications device on said communications channel.

11. The testable data communications device of claim 1 where said data communication means includes a digital signal processor.

12. A testable data communications device having a data terminal equipment port, a data communication equipment port, and a control signal port, said data terminal equipment port, data communication equipment port and said control signal port being electrically and physically distinct, said data communications device coupling information between a data terminal equipment device coupled to said data terminal equipment port and a communications channel coupled to said data communication equipment port, said data communications device communicating with a network management system controller through said control signal port over a control channel, said data communications device comprising:

coupling means, coupled to said control signal port, for coupling information between said network system controller and said data communications device via said control channel through said control signal port;

data communication means coupled to the coupling means for coupling information from said data terminal equipment device to said communications channel; for coupling information from said communications channel to said data terminal equipment device, and, in response to control signals received at data communication equipment port, for coupling a first signals received at data communication equipment port, for coupling a first signal received through said data communication equipment port through said data communications means, said first signal being processed by said data communications means to a second signal corresponding to said first signal, and for coupling said second signal back to said data communication equipment port;

said data communication means further including means for routing test information signals through said data communication means.

13. The testable data communications device of claim 12 where said control signal received at said data communication equipment port are test information signals and control information signals, said control information signals controlling the routing of test information signals through said data communication means.

14. The testable data communications device of claim 12 where said coupling means is comprised of:

controller means coupled to the control signal port for processing control signals received on said data communication equipment port, and for generating control signals for said data communication means.

15. The testable data communications device of claim 14 where said data communication means is further comprised of:

digital to analog converter means coupled to the data communications equipment port, having a first digital input and a first analog output, for converting digital information signals into analog information signals at said first analog output that are compatible with said communications channel;

first digital control logic means coupled to the digital to analog converter means, having a first input for coupling digital information signals from said data terminal equipment device to said first digital input of said digital to analog converter means and having a second input for coupling digital information signals 28 from said controller means to said first digital input of said digital to analog converter means and an output;

analog to digital converter means coupled to the data communications equipment port, having a first analog input and a first digital output, for converting analog information signals received on said communications channel at said first analog input to digital information signals output at said first digital output;

second digital control logic means coupled to the analog to digital converter means, having an input and at least first and second outputs, said first output for coupling digital information signals received from said first digital output of said analog to digital converter means to said data terminal equipment device, said second output for coupling digital information signals received from said first digital output of said analog to digital converter means to said controller means.

16. The testable data communications device of claim 15 further including:

first switch means coupled to the data communications equipment port for coupling signals from said first analog input to said first analog output.

17. The testable data communications device of claim 15 further including:

second switch means coupled to the analog to digital converter means for coupling digital signals output from said first digital output to said first digital input.

18. The testable data communications adaptor of claim 14 where said controller means includes a link adaptor.

19. The testable data communications device of claim 18 where said link adaptor means includes a microcomputer.

20. A distributed data communications network for coupling information between a plurality of data terminal equipment devices using communications channels, said distributed data communications network being comprised of:

at least one data communications device having a data terminal equipment port for coupling a data terminal equipment device to said at least one data communications device, a data communication equipment port for coupling a communications channel to said at least one data communications device, and a control port for coupling a network management controller for said distributed data communications network, said network management controller exchanging control and test information signals, with said at least one data communications device, said at least one data communications device including a link adaptor means, responsive to test information signals from said network management controller, for controlling the testing of said at least one data communications device;

network management system controller means for sending control and test information signals to said at least one data communication device and for receiving control and test information signal responses from said at least one data communication device;

control channel means for carrying said control and test information signals and said control and test information signal responses between said network management system controller means and said at least one data communication device;

whereby said at least one data communications device is arranged to be tested automatically and remotely by said network management system controller means using signals carried on said control channel.

21. The distributed data communications network of claim 20 where said communications channel is a telephone line.

22. The distributed data communications network of claim 20 where said communications channel is a microwave communications system.

23. The distributed data communications network of claim 20 where said communications channel includes a fiber optic cable.

24. The distributed data communications network of claim 20 where said link adaptor is a computer.

25. The distributed data communications network of claim 20 where said network management controller is a computer.

26. The distributed data communications network of claim 20 where said control channel includes means for carrying serial digital data.

27. The distributed data communications network of claim 20 where said control channel includes means for carrying serial analog data.

28. The distributed data communications network of claim 20 where said control channel includes means for carrying parallel digital data.

29. The distributed data communications network of claim 20 including means for performing remote digital loopback testing.

* * * * *